(12) United States Patent
Binzer et al.

(10) Patent No.: US 9,653,807 B2
(45) Date of Patent: May 16, 2017

(54) PLANAR ARRAY ANTENNA HAVING ANTENNA ELEMENTS ARRANGED IN A PLURALITY OF PLANES

(75) Inventors: Thomas Binzer, Ingersheim (DE); Christian Waldschmidt, Renningen (DE); Raphael Hellinger, Pforzheim (DE); Thomas Hansen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 13/820,986

(22) PCT Filed: Jul. 27, 2011

(86) PCT No.: PCT/EP2011/062859
§ 371 (c)(1),
(2), (4) Date: May 17, 2013

(87) PCT Pub. No.: WO2012/034762
PCT Pub. Date: Mar. 22, 2012

(65) Prior Publication Data
US 2013/0222197 A1    Aug. 29, 2013

(30) Foreign Application Priority Data
Sep. 15, 2010 (DE) .......... 10 2010 040 809

(51) Int. Cl.
*H01Q 9/04* (2006.01)
*H01Q 21/00* (2006.01)
(Continued)

(52) U.S. Cl.
CPC ........ *H01Q 9/0414* (2013.01); *H01Q 1/3233* (2013.01); *H01Q 19/005* (2013.01);
(Continued)

(58) Field of Classification Search
CPC .................................................. H01Q 21/0075
See application file for complete search history.

(56) References Cited

U.S. PATENT DOCUMENTS 5,006,859 A * 4/1991 Wong et al. ........... 343/700 MS
6,091,373 A * 7/2000 Raguenet ............. H01Q 9/0414
                                                     333/137
(Continued)

FOREIGN PATENT DOCUMENTS

CN          1993860          7/2007
CN          101095261        12/2007
(Continued)

OTHER PUBLICATIONS

International Search Report for PCT/EP2011/062589, dated Oct. 21, 2011.

*Primary Examiner* — Robert Karacsony
(74) *Attorney, Agent, or Firm* — Norton Rose Fulbright US LLP

(57) ABSTRACT

A planar array antenna for radar sensors includes: a plurality of base antenna elements situated in a common plane on a printed circuit board; and additional antenna elements, which are situated in an offset plane, in each case over one of the base antenna elements. Each additional antenna element is situated individually on an associated carrier, and the printed circuit board is equipped with the individual carriers.

20 Claims, 2 Drawing Sheets

(51) Int. Cl.
*H01Q 1/32* (2006.01)
*H01Q 21/06* (2006.01)
*H01Q 19/00* (2006.01)
G01S 13/93 (2006.01)
G01S 7/02 (2006.01)

(52) U.S. Cl.
CPC ....... *H01Q 21/0075* (2013.01); *H01Q 21/064* (2013.01); *H01Q 21/065* (2013.01); G01S 13/931 (2013.01); G01S 2007/028 (2013.01); G01S 2013/9321 (2013.01); H01Q 9/0457 (2013.01)

(56) References Cited

U.S. PATENT DOCUMENTS

| | | |
|---|---|---|
| 6,999,030 B1 | 2/2006 | Mateychuk |
| 2008/0316106 A1* | 12/2008 | Voigtlaender .......... 343/700 MS |
| 2009/0096679 A1* | 4/2009 | Harokopus ............ 343/700 MS |
| 2009/0174613 A1* | 7/2009 | Liu et al. ...................... 343/702 |
| 2009/0267856 A1 | 10/2009 | Schadler et al. |
| 2010/0053026 A1* | 3/2010 | Van Der Poel ............... 343/908 |

FOREIGN PATENT DOCUMENTS

| | | |
|---|---|---|
| DE | 20 2004 008770 | 8/2004 |
| DE | 10 2004 063541 | 7/2006 |
| EP | 1 469 552 | 10/2004 |
| FR | 2 757 315 | 6/1998 |
| TW | 200931718 | 7/2009 |

* cited by examiner

PLANAR ARRAY ANTENNA HAVING ANTENNA ELEMENTS ARRANGED IN A PLURALITY OF PLANES

BACKGROUND OF THE INVENTION

1. Field of the Invention

The present invention relates to a planar array antenna for radar sensors, having a plurality of base antenna elements arranged in a common plane on a printed circuit board and having additional antenna elements which are arranged in an offset plane in each case above one of the base antenna elements. In particular, the present invention is concerned with an array antenna for radar sensors, which are used in motor vehicles in connection with driver assistance systems, for instance, for position finding of preceding vehicles in an automatic adaptive cruise control system. These radar sensors typically operate at a frequency of 24 GHz or 77 GHz.

2. Description of the Related Art

In these applications, planar antennas in microstrip technology have the advantage that they may be produced comparatively cost-effectively, and make a flat construction possible, and that no junctions between different line systems or line types are required. The base antenna elements may be formed on a printed circuit board in the same way as the other circuit components, simply by appropriate microstrip conductors. The desired directional pattern of the antenna is achieved in that the microwave power, which is supplied to the individual base antenna elements via a feed line, is subdivided, with the aid of power transformers, in such a way to the antenna elements that, by interference, a main lobe is obtained, and minor lobes are extensively suppressed. The base antenna elements, in this instance, should be developed in such a way that, within a certain bandwidth, a good impedance matching is achieved and reflections of the supplied microwave power are avoided. The bandwidth is a function of the thickness of the printed circuit board. At 77 GHz, using printed circuit boards having a thickness of 100 to 130 μm, a bandwidth of about 1 to 2 GHz is achievable.

However, taking into account unavoidable production tolerances, it would be desirable to attain a clearly greater bandwidth, such as one increased by a factor of 3. One known possibility for increasing the bandwidth is to assign an additional antenna element to each base antenna element, which is arranged in parallel to the associated base antenna element. In this context, the additional antenna elements have to be aligned correctly relative to the base antenna elements.

In one known layout, the base antenna elements, on the one hand, and the additional antenna elements, on the other hand, are situated on two congruent printed circuit boards, which are then layered congruently one over the other. However, producing such an antenna array is relatively costly. An additional disadvantage is that, on the printed circuit board, which carries the base antenna element, no additional HF circuit components of the radar sensor are able to be accommodated.

If, on the other hand, one obtains a smaller top view for the printed circuit board that carries the additional antenna elements, the alignment of the antenna elements relative to one another becomes even more difficult.

BRIEF SUMMARY OF THE INVENTION

It is an object of the present invention to provide an antenna array of the type mentioned at the outset, which is easier to produce.

This object is attained by the present invention in that each additional antenna element is situated by itself on an associated carrier, and the printed circuit board is fitted with these individual carriers.

The carriers, which each accommodate a single additional antenna element, are able to be produced cost-effectively in large piece numbers. For the purpose of fitting the printed circuit board with carriers thus prepared, current manufacturing technologies, such as SMD technology (surface mounting device) may be used, which are usual for equipping printed circuit boards with electronic components. This makes a simple and accurate alignment of the additional antenna elements relative to the associated base antenna elements possible. Since the carriers having the additional antenna elements take up only a small proportion of the surface of the printed circuit board, there is, in addition, the advantageous possibility of equipping the printed circuit board with additional circuit components, so that a compactly constructed radar sensor may be formed.

It is often not required to provide every single base antenna element with an additional antenna element. Rather, a great bandwidth is often also achieved by only equipping those base antenna elements with an additional antenna element, via which the greatest proportion of the power is radiated. The present invention permits flexibly varying the scheme for equipping the printed circuit board with additional antenna elements.

The base antenna elements may be microstrip antennas or optionally even other planar antenna structures, such as slot radiators.

In the following, exemplary embodiments of the present invention are explained in detail with reference to the drawing.

DETAILED DESCRIPTION OF THE INVENTION

Figure 1:
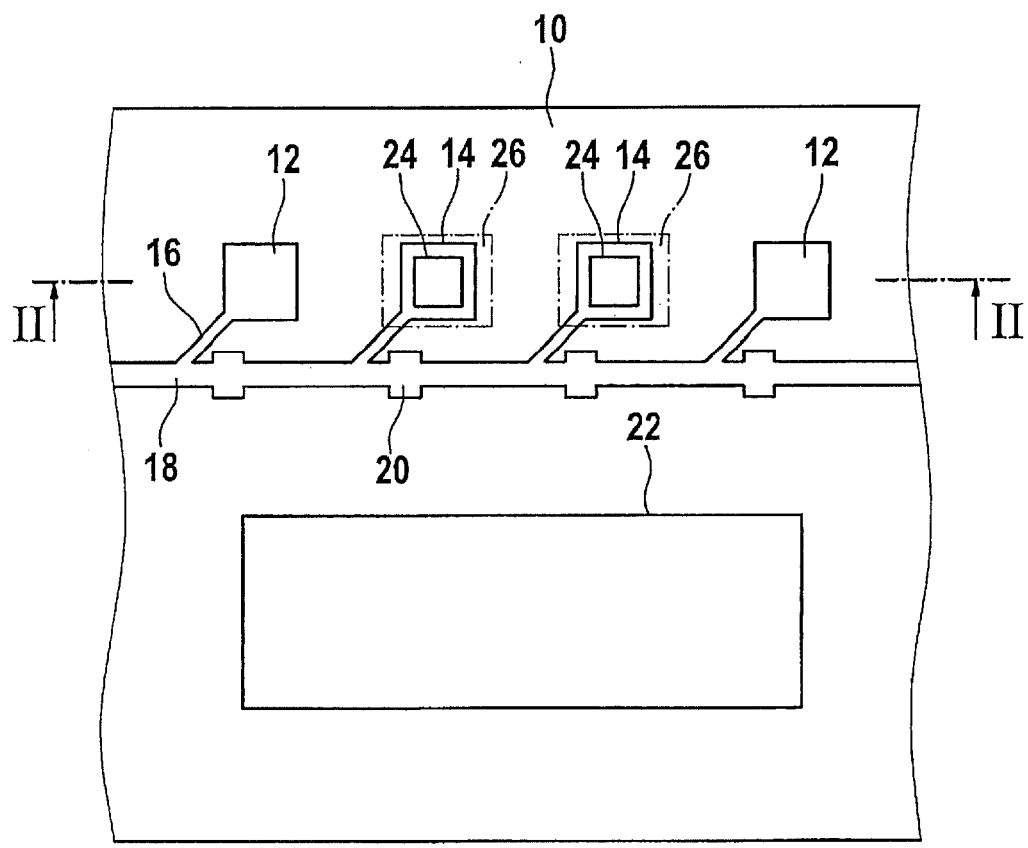
FIG. 1 shows a top view of an array antenna according to a specific embodiment of the present invention.

The array antenna shown in FIG. 1 is developed, for instance, in microstrip technology on a printed circuit board 10, and has four quadratic base antenna elements 12, 14 situated in a row (or column), which are each connected to a common feed line 18, via a supply line 16, via which they are supplied with microwave power. A transformer 20 is assigned to each supply line 16, which is situated in feed line 18, and which determines the subdivision of the microwave power to the various base antenna elements 12, 14. An additional component 22 of a high-frequency circuit is situated on printed circuit board 10.

To each of the two middle base antenna elements 14 an additional antenna element 24 is assigned, which, by a resonance link to the associated base antenna element, takes care of an increase in the bandwidth, within which antenna elements 12, 14 are matched, low in reflection. Each additional antenna element 24 has a similar, but somewhat smaller top view, to the respective base antenna element 14, and is situated on the surface of a carrier 26 (indicated only by a dash-dotted line in FIG. 1).

The form and situation of base antenna elements 12, 14 relative to respective supply lines 16 may vary depending on the specific embodiment, and determines the direction of polarization of the radiation emitted. The forms and orientations of additional antenna elements 24 are then each matched accordingly.

Figure 2:
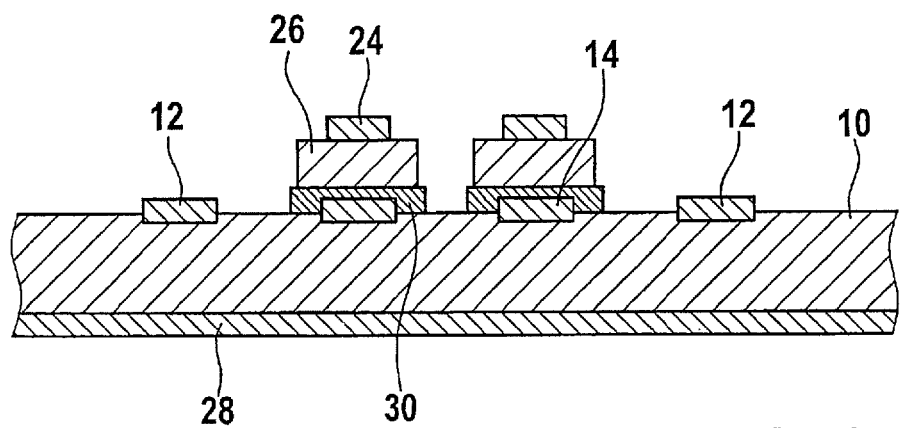
FIG. 2 shows a section along line II-II in FIG. 1.

As may be seen in FIG. 2, printed circuit board 10 is formed by a dielectric plate, which carries on one surface base antenna element 12, 14, and on the opposite surface has an electrically conductive (ground) layer 28. The dielectric plate has a thickness of 100 to 130 µm, for example. Carriers 26 are each formed by a parallelepiped-shaped block of a high-frequency-tolerant (dielectric) material, whose dimensions are similar to the usual SMD components. Each carrier 26, together with additional antenna element 24 situated on it thus forms a "chip", which, with the aid of an SMD pick-and-place machine, in a known manner, is mounted on the surface of printed circuit board 10 so that additional antenna element 24 lies in a correct position on top of associated base antenna element 14. Each of inner base antenna elements 14 is covered by a bonding film 30, by which carrier 26 is fixed on printed circuit board 10.

Figure 3:
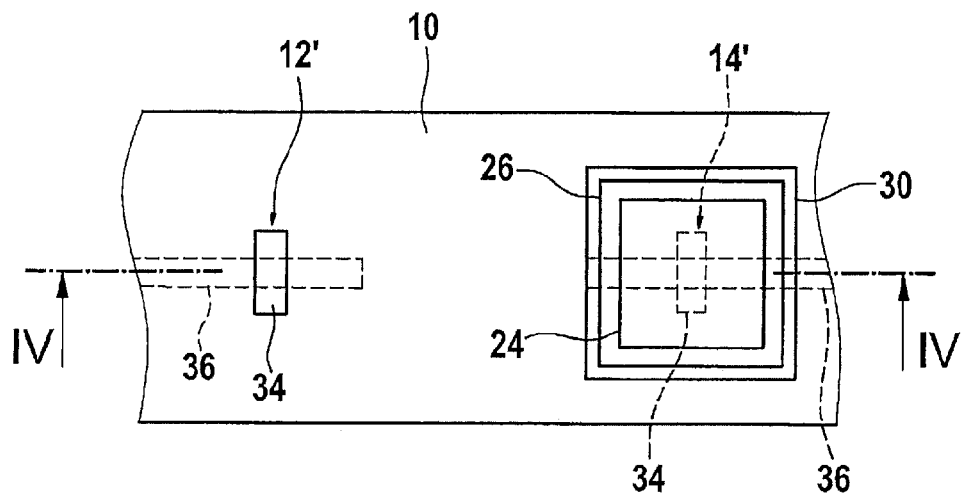
FIG. 3 shows a top view of an array antenna according to a specific embodiment of the present invention.
Figure 4:
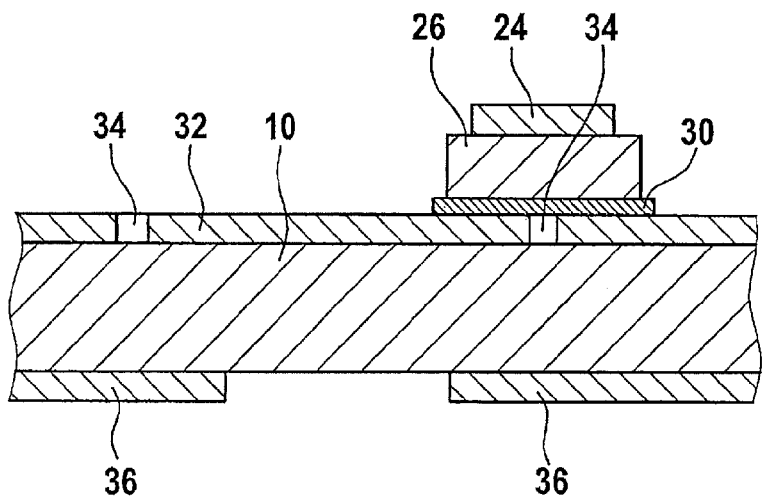
FIG. 4 shows a section along the line IV-IV in FIG. 3.

FIGS. 3 and 4 show a modified exemplary embodiment, in which base antenna elements 12', 14' are formed by slot radiators. As shown in FIG. 4, printed circuit board 10 at its upper side is provided with a continuous metallic coating 32, in which slots 34 are developed to form the slot radiators. On the upper side of printed circuit board 10, microstrip lines 36 are situated which cross slots 34 at right angles, and are used to supply microwave power to the slot radiators.

An additional antenna element 24 is assigned to base antenna element 14', which is situated on the surface of a carrier 26.

Carrier 26 has the dimensions of an SMD chip, and is fixed using a bonding film 30, or an adhesive, to conductive layer 32.

What is claimed is:

1. A planar array antenna for a radar sensor, comprising: a plurality of base antenna elements arranged in a common plane on a printed circuit board; and
additional secondary antenna elements situated in an offset plane, wherein each of the additional secondary antenna elements is (i) situated above an assigned one of the base antenna elements, and (ii) situated individually on an associated individual carrier, a lower surface of each of the additional secondary antenna elements contacting an upper surface of the respective associated individual carrier;
wherein a lower surface, opposite the upper surface, of each of the associated individual carriers is positioned on the printed circuit board,
wherein each of the additional secondary antenna elements covers only a portion of the assigned one of the base antenna elements,
wherein the base antenna elements and supply lines assigned to the base antenna elements are configured as microstrip conductors,
wherein at least one first portion of the lower surface of each of the individual carriers is bonded to the printed circuit board,
wherein at least one second portion of the lower surface of each of the individual carriers is bonded to the assigned one of the base antenna elements, and
wherein each of the base antenna elements, which is assigned to one of the additional secondary antenna elements, is covered by a bonding film, by which each of the individual carriers is fixed on the printed circuit board.

2. The array antenna as recited in claim 1, wherein the lower surface of each of the additional secondary antenna elements fully contacts the upper surface of the respective associated individual carrier.

3. The array antenna as recited in claim 1, wherein each of the base antenna elements is situated in a row or a column, and are each connected to a common feed line, via a corresponding supply line, via each of which is supplied with microwave power.

4. The array antenna as recited in claim 3, wherein a transformer is assigned to each corresponding supply line, which is situated in the feed line, and which determines a subdivision of the microwave power to the base antenna elements.

5. The array antenna as recited in claim 1, wherein the printed circuit board is formed by a dielectric plate, which carries on one surface the base antenna elements, and having on an opposite surface an electrically conductive ground layer.

6. The array antenna as recited in claim 5, wherein the dielectric plate has a thickness of 100 to 130 µm, and wherein each of the carriers is formed by a parallelepiped-shaped block of a high-frequency-tolerant dielectric material.

7. The array antenna as recited in claim 1, wherein there is a resonance link between each of the base antenna elements and its respective assigned one of the additional antenna elements, and wherein the resonance link takes care of an increase in the bandwidth.

8. The array antenna as recited in claim 1, wherein the base antenna elements are formed by slot radiators.

9. The array antenna as recited in claim 8, wherein the printed circuit board at its upper side is provided with a continuous metallic coating, in which slots are provided to form the slot radiators.

10. The array antenna as recited in claim 9, wherein on an upper side of the printed circuit board, microstrip lines are situated which cross the slots at right angles and are used to supply microwave power to the slot radiators.

11. A method for producing a planar array antenna having a plurality of base antenna elements arranged in a common plane on a printed circuit board, and additional secondary antenna elements situated in an offset plane, the method comprising:
producing surface mounting device (SMD) chips, wherein each SMD chip is formed by a carrier which carries one of the additional secondary antenna elements on the surface of the carrier; and
equipping the printed circuit board with the SMD chips with the aid of an SMD pick-and-place machine, in such a way that the additional secondary antenna elements are in each case located above an associated one of the base antenna elements;
wherein a lower surface of each of the additional secondary antenna elements contacts an upper surface of the respective associated carrier,
wherein a lower surface, opposite the upper surface, of each of the carriers is positioned on the printed circuit board,
wherein each of the additional secondary antenna elements covers only a portion of the associated one of the base antenna elements,
wherein the base antenna elements and supply lines assigned to the base antenna elements are configured as microstrip conductors, wherein at least one first portion of the lower surface of each of the individual carriers is bonded to the printed circuit board, wherein at least one second portion of the lower surface of each of the individual carriers is bonded to the assigned one of the base antenna elements, and wherein each of the base antenna elements, which is assigned to one of the additional secondary antenna elements, is covered by a bonding film, by which each of the individual carriers is fixed on the printed circuit board.

12. The method as recited in claim 11, wherein the lower surface of each of the additional secondary antenna elements fully contacts the upper surface of the respective associated individual carrier.

13. The method as recited in claim 11, wherein each of the base antenna elements is situated in a row or a column, and are each connected to a common feed line, via a corresponding supply line, via each of which is supplied with microwave power.

14. The method as recited in claim 13, wherein a transformer is assigned to each corresponding supply line, which is situated in the feed line, and which determines a subdivision of the microwave power to the base antenna elements.

15. The method as recited in claim 11, wherein the printed circuit board is formed by a dielectric plate, which carries on one surface the base antenna elements, and having on an opposite surface an electrically conductive ground layer.

16. The method as recited in claim 15, wherein the dielectric plate has a thickness of 100 to 130 μm, and wherein each of the carriers is formed by a parallelepiped-shaped block of a high-frequency-tolerant dielectric material.

17. The method as recited in claim 11, wherein there is a resonance link between each of the base antenna elements and its respective assigned one of the additional antenna elements, and wherein the resonance link takes care of an increase in the bandwidth.

18. The method as recited in claim 11, wherein the base antenna elements are formed by slot radiators.

19. The method as recited in claim 18, wherein the printed circuit board at its upper side is provided with a continuous metallic coating, in which slots are provided to form the slot radiators.

20. The method as recited in claim 19, wherein on an upper side of the printed circuit board, microstrip lines are situated which cross the slots at right angles and are used to supply microwave power to the slot radiators.

* * * * *